United States Patent [19]
Lunn

[11] Patent Number: 6,081,980
[45] Date of Patent: Jul. 4, 2000

[54] ECLIPTIC DRIVE

[75] Inventor: Garfield R. Lunn, Amhurstberg, Canada

[73] Assignee: Cobra Machine Tool, Tecumseh

[21] Appl. No.: 09/250,591

[22] Filed: Feb. 16, 1999

[51] Int. Cl.[7] .............. B23C 1/04; B23C 3/32; F16H 9/00; F16H 9/26
[52] U.S. Cl. .............. 29/50; 29/56.5; 29/26 A; 409/74; 409/192; 474/73
[58] Field of Search .................. 409/192, 200, 409/203, 213, 217, 231, 74; 29/26 A, 50, 56.5; 451/294, 69, 363; 474/65, 72, 73, 86, 88

[56] References Cited

U.S. PATENT DOCUMENTS

| | | | |
|---|---|---|---|
| 2,566,579 | 9/1951 | Nichols | 74/217 |
| 2,828,845 | 4/1958 | Thornton | 192/96 |
| 2,975,563 | 3/1961 | Bovensiepen | 51/111 |
| 4,044,633 | 8/1977 | Lee | 74/750 R |
| 4,333,261 | 6/1982 | Eadon-Allen | 51/160 |
| 4,606,683 | 8/1986 | Link et al. | 409/66 |
| 4,656,788 | 4/1987 | Rhoades et al. | 51/58 |
| 4,662,861 | 5/1987 | Seung et al. | 474/86 |
| 4,789,278 | 12/1988 | Dexter et al. | 409/200 |
| 5,016,399 | 5/1991 | Vinson | 51/118 |
| 5,055,087 | 10/1991 | Koch | 474/73 |
| 5,061,125 | 10/1991 | Kuppinger | 408/150 |
| 5,105,583 | 4/1992 | Hammond et al. | 51/120 |
| 5,163,882 | 11/1992 | Aldinger | 474/84 |
| 5,328,306 | 7/1994 | Rehm et al. | 408/125 |
| 5,667,428 | 9/1997 | Lunn | 451/70 |
| 5,816,892 | 10/1998 | Lunn | 451/21 |
| 5,954,611 | 9/1999 | Mills et al. | 475/182 |

FOREIGN PATENT DOCUMENTS 2840-810  4/1980  Germany ................ 474/73

*Primary Examiner*—Andrea L. Pitts
*Assistant Examiner*—Erica D. Ergenbright
*Attorney, Agent, or Firm*—Howard & Howard

[57] ABSTRACT

A drive apparatus for a simultaneous operation machine includes a plurality of pulleys and drive belts in a unique orientation to simultaneously drive a plurality of spindles. A first outer spindle is driven about a first axis of rotation to perform a first operation such as machining. An inner spindle is disposed within the outer spindle and is driven about a second axis which is offset from and parallel to the first axis to simultaneously perform a second operation, such as grinding. Additionally, the drive apparatus is capable of rotating the second spindle about the second axis while orbiting about the first axis, and simultaneously rotating of the first spindle about the first axis. Preferably, a single motor is provided for driving both of the outer and inner spindles.

9 Claims, 6 Drawing Sheets

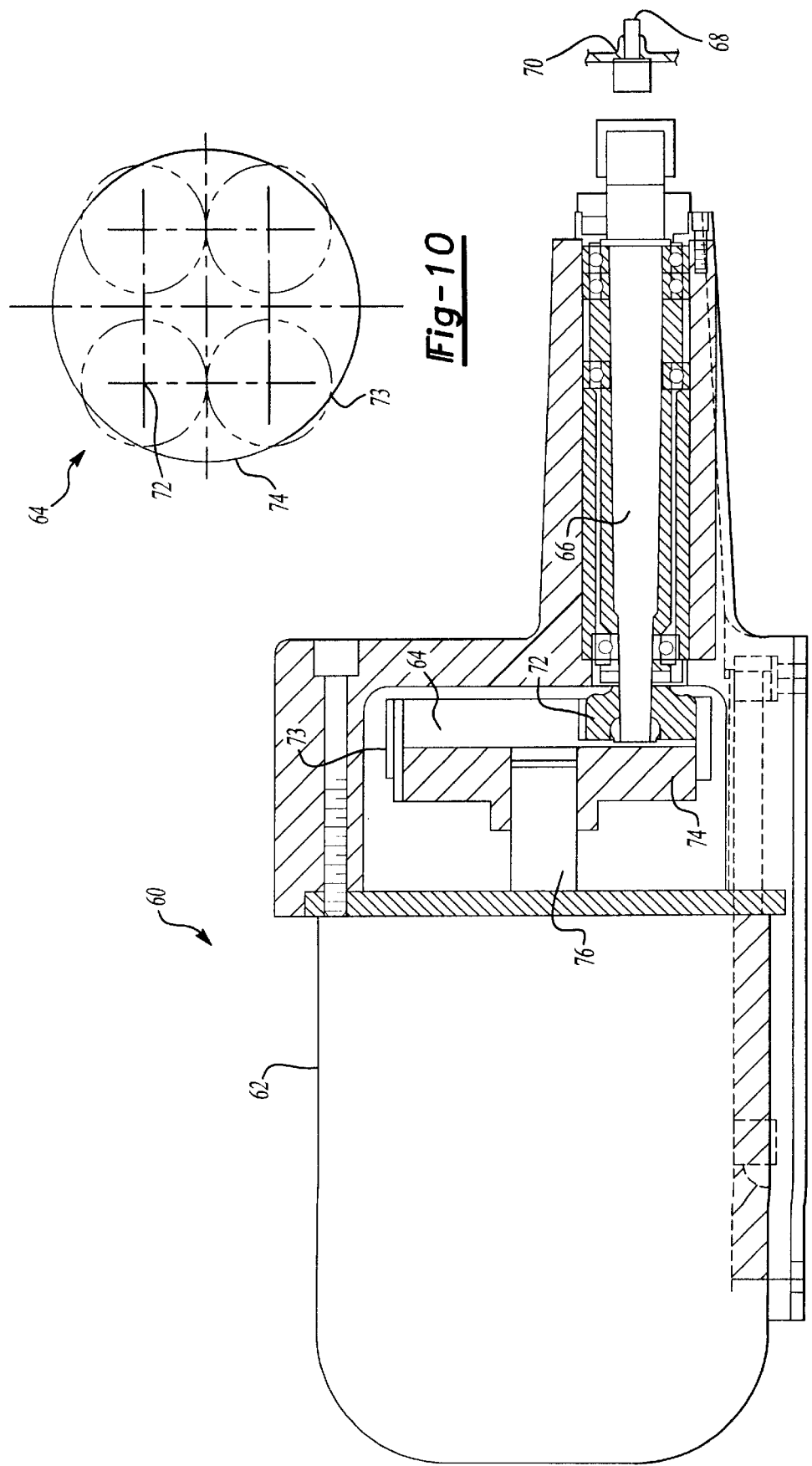

ECLIPTIC DRIVE

BACKGROUND OF THE INVENTION

The present invention relates to a drive for a machine, and more particularly to a drive train assembly which can perform multiple simultaneous outputs when driven by a single motor.

Machines which perform simultaneous operations on a work piece are known. One such machine includes a cutting ring having milling inserts mounted thereon, and a grinding wheel disposed eccentrically inside of the cutting ring. The milling ring and grinding wheel are driven at different respective speeds about a common axis of rotation by means of respective drive motors. Additionally, the grinding wheel can be driven to travel in an orbit inside of the cutting ring such that surface grinding is improved.

However, drives for such simultaneous operation machines exhibit certain shortcomings. One such shortcoming is the complexity in the drive train assembly. The drive train assembly may employ a complex planetary gear system to drive the individual machine operations. Such a planetary gear system is complex and noisy in operation. Further, the gear system is expensive to manufacture and difficult to convert to perform other machine operations.

Therefore, it would be desirable to provide a drive train assembly for a simultaneous operation machine which eliminates the above-described shortcomings. It would also be desirable to render the machine more compact in size and less costly to make.

SUMMARY OF THE INVENTION

The present invention overcomes the problems encountered with conventional simultaneous operation drives by providing a unique pulley and belt drive which is inexpensive, quiet and light weight. The present invention further provides the ability to drive other simultaneous machine operations such as elliptical grinders and multiple drill heads from a single motor presently being driven by straight or helical gear trains.

The present invention relates to a drive apparatus for performing simultaneous operations on a work piece. The drive apparatus includes a plurality of pulleys and drive belts in a unique orientation to simultaneously drive a plurality of spindles. A first outer spindle is driven about a first axis of rotation to perform a first operation such as machining, and an inner spindle is disposed within the outer spindle. The inner spindle is driven about a second axis which is offset from and parallel to the first axis to simultaneously perform a second operation, such as grinding. Additionally, the drive apparatus is capable of rotating the second spindle about the second axis while orbiting about the first axis, during rotation of the first spindle about the first axis. Preferably, a single motor is provided for driving both of the outer and inner spindles.

In another embodiment of the present invention a plurality of offset and parallel spindles are provided such that multiple secondary operations such as multiple hole drilling can be simultaneously performed.

Finally, an embodiment of the milling/grinding machine is disclosed. The grinding wheel is eccentrically mounted relative to the milling cutter, but does not orbit.

BRIEF DESCRIPTION OF THE DRAWINGS

Other advantages of the present invention will be readily appreciated as the same becomes better understood by reference to the following detailed description when considered in connection with the accompanying drawings wherein:

FIG. 9 is another embodiment of a drive train assembly according to the present invention; and FIG. 10 is a schematic view of the pulley and belt interrelationship of FIG. 9.

DETAILED DESCRIPTION OF THE PREFERRED EMBODIMENT

Figure 1:
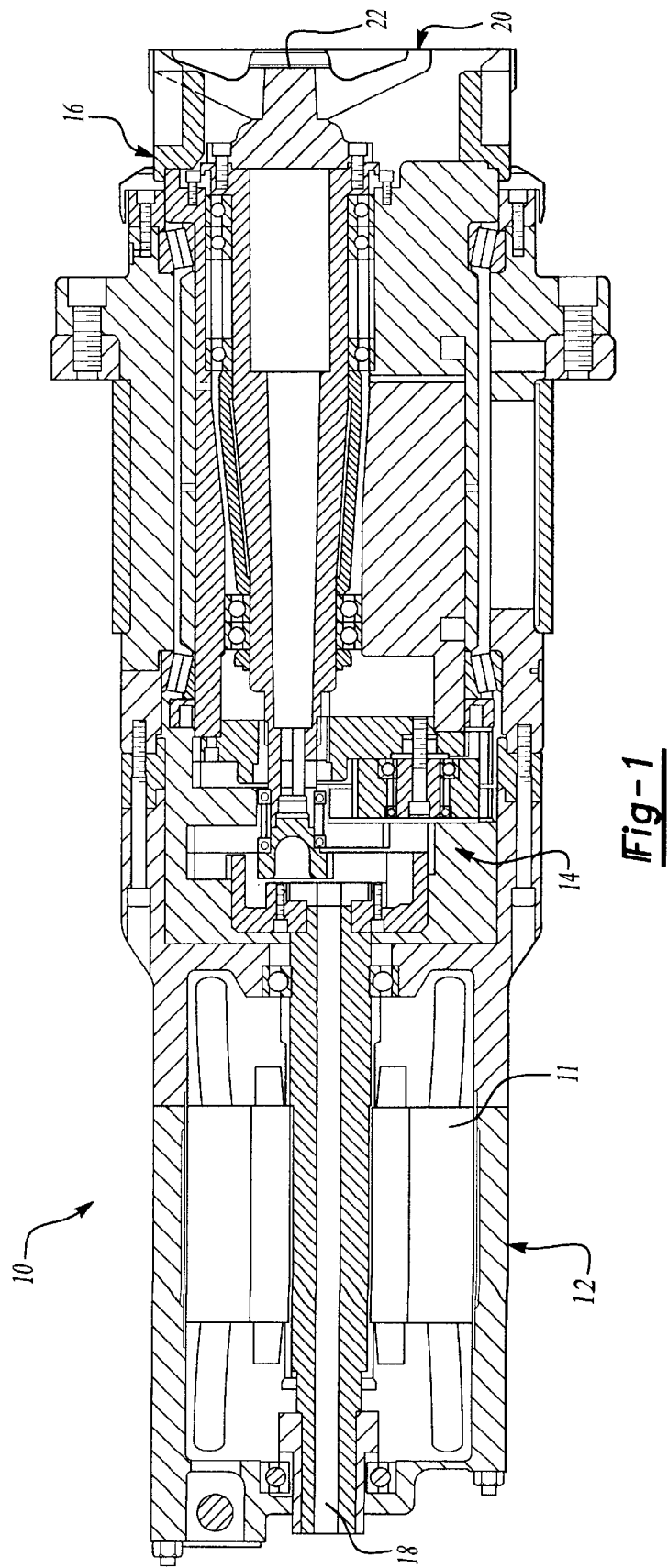
FIG. 1 is a detailed perspective view of a simultaneous operation machine of the present invention.

A simultaneous operation drive machine 10 is shown in FIG. 1. The simultaneous operation drive machine 10 generally includes a motor assembly 12, and a drive train assembly 14. The drive train assembly 14 drives a first output 16 about a first axis 18 of rotation. A second output 20 is similarly rotatably drivable by the drive train assembly 14 about a second axis 22 extending parallel to the first axis 18 and offset radially therefrom. The first 16 and second 20 output being drivable by the drive train assembly 14 at relatively different speeds.

The first output 16 is disclosed as a hollow spindle to perform an operation such as milling. The second output 20 is typically an inner spindle which rotates within the hollow outer spindle to perform a second operation such as grinding. Although a primary operation such as milling and a secondary operation such as grinding will be explained below, one skilled in the art will understand that the drive train assembly 14 of the present invention is equally applicable to other machine operations.

Figure 2:
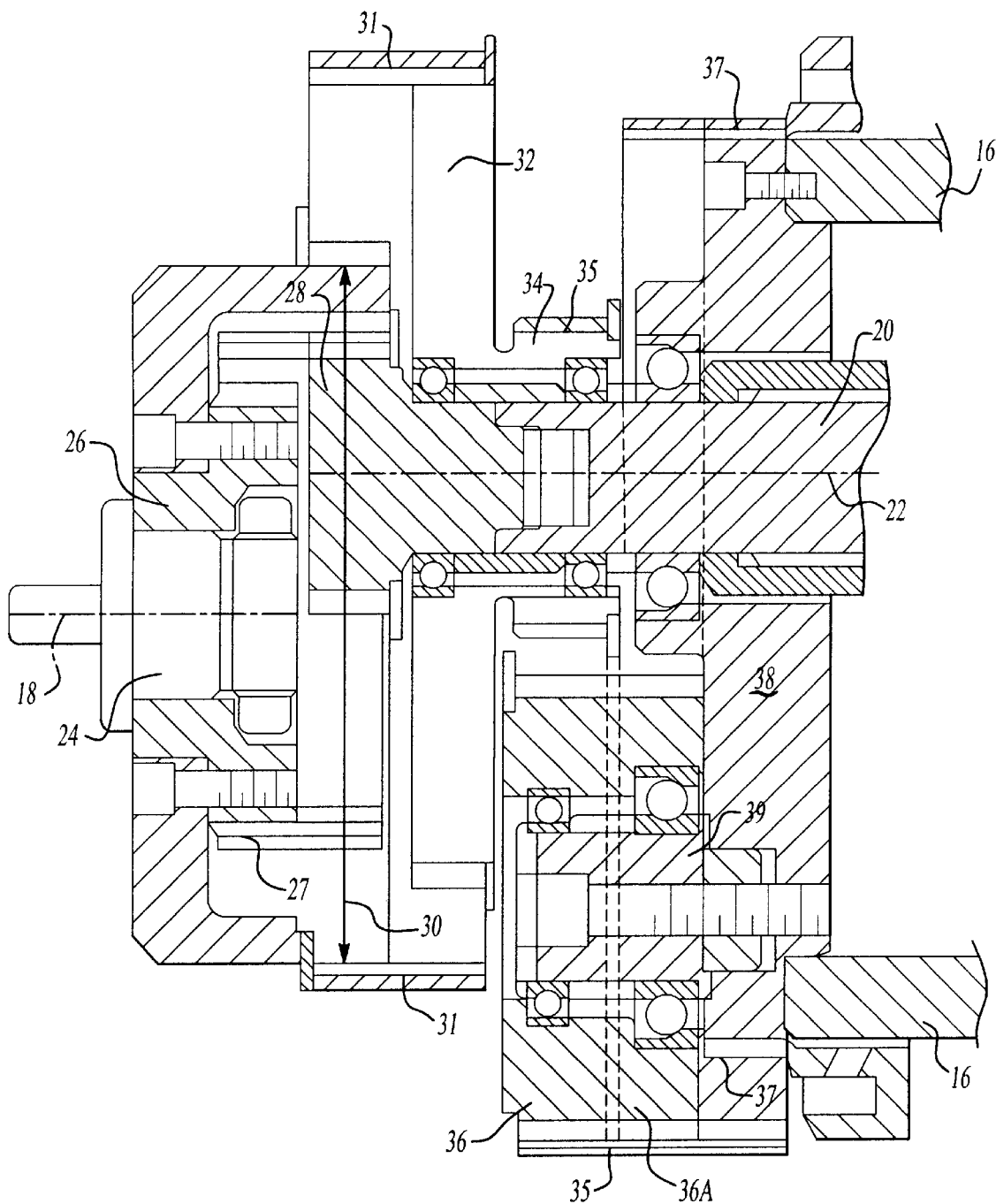
FIG. 2 is expanded cross sectional view of the drive train assembly of FIG. 1.

FIG. 2 provides a detailed sectional view of the drive train assembly 14 according to the present invention. As will be further described, the present invention generally includes a plurality of interrelated pulleys and belts to drive multiple outputs from a single input. Although other drives are possible, the present invention preferably provides pulleys and belts that are toothed to decrease the possibility of slip and decrease the tolerance requirements necessary of non-toothed belts.

As shown in FIG. 2, the motor assembly 12 is attached to the drive train assembly 14 at an axle 24 along the first axis of rotation 18 such that rotation of the motor 11 causes rotation of the axle 24 and an attached first pulley 26. Preferably, a single motor 11 provides the motive force to the drive train assembly 14 which then drives the multiple outputs.

Figure 3:
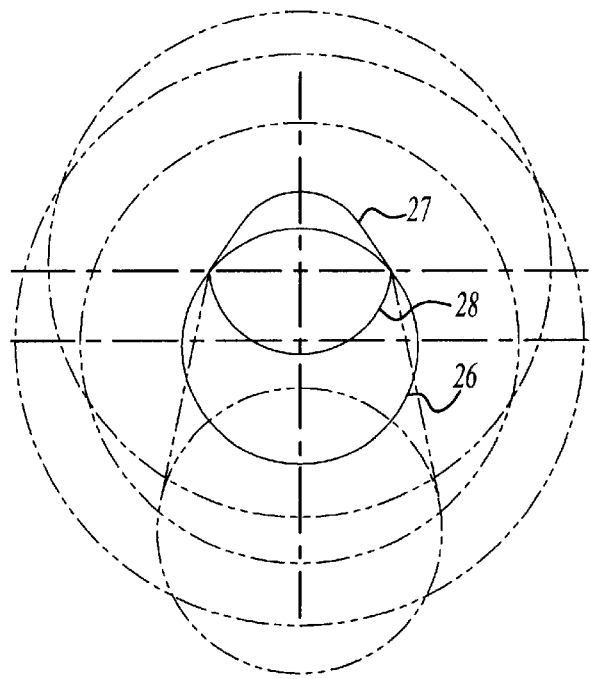
FIG. 3 is a schematic view of a pulley and belt interrelationship of the drive train assembly of FIG. 2 illustrating the rotatable motion of the second output.

As shown in FIG. 2 and FIG. 3, the second output 20 is attached to a pulley 28. The second output 20 is preferably a spindle which is attachable to a tool head such as a grinder (FIG. 1). Pulley 28 is driven by the first pulley 26 through a belt 27. Belt 27 thereby rotatably drives the second output 20. The rotation of the second output 20 is varied by the speed of the motor 11 as reduced by first pulley 26, and pulley 28. The second output 20 is rotated along the second axis of rotation 22. The second output 20 is thereby rotatably driven to perform the secondary operation with a first operation which will be more fully described below.

Figure 4:
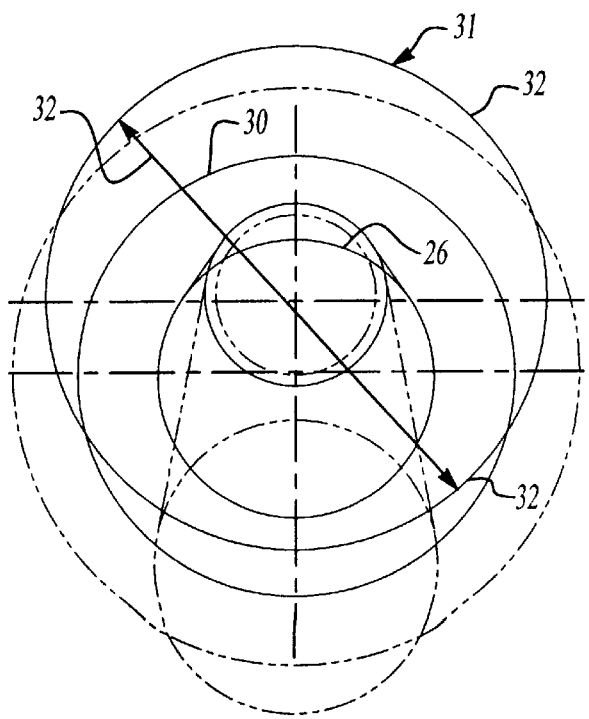
FIG. 4 is a schematic view of the pulley and belt interrelationship of FIG. 2 illustrating the relationship of rotatable motion between the second and first output.

Referring to FIG. 2 and to FIG. 4, rotation of the first pulley 26 directly rotates pulley 30. As shown, pulley 30 is integral with pulley 26 such that rotation of the motor 11 causes rotation of the axle 24, the first pulley 26 and integral pulley 30. Pulley 30 rotates a pulley 32 through a belt 31.

Figure 5:
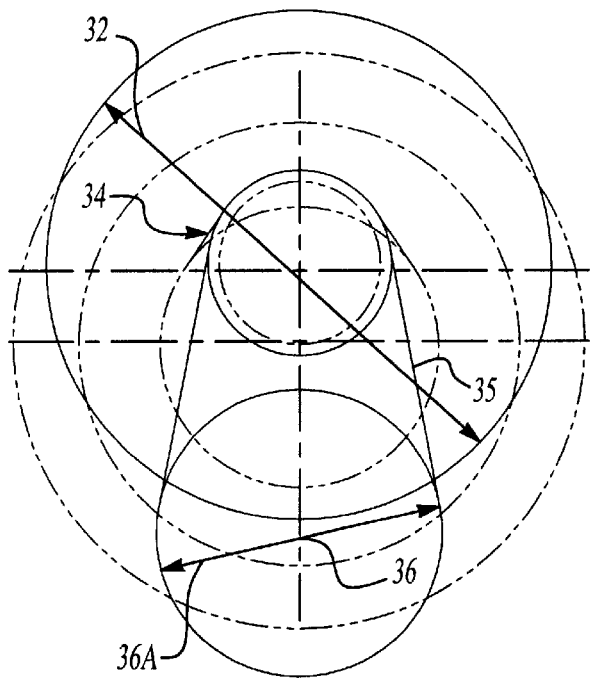
FIG. 5 is a schematic view of the pulley and belt interrelationship of FIG. 2 illustrating the next relationship of rotatable motion between the second and first output.

Referring again to FIG. 2 and now to FIG. 5, pulley 32 directly rotates pulley 34 as pulley 34 is similarly integral with pulley 32. Pulley 34 thus rotates at the same speed as pulley 32 but provides a reduced diameter for a belt 35. Pulley 34 can then drive a pulley 36, 36A through the single wide belt 35.

Figure 6:
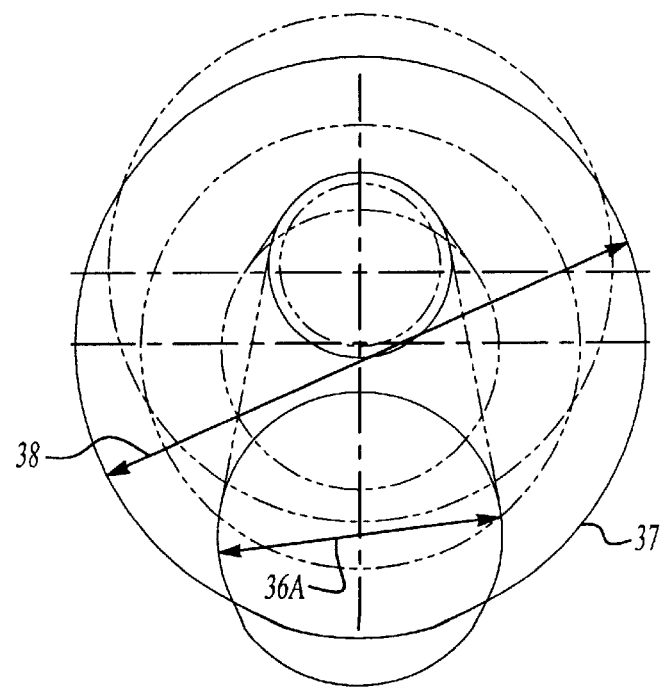
FIG. 6 is a schematic view of the pulley and belt interrelationship of FIG. 2 illustrating the rotatable motion of the first output.

Referring again to FIG. 2 and now to FIG. 6, pulley 36A rotatably drives mount 38 through a double width belt 37. Mount 38 is rotated along the first axis 18 which is offset from and parallel to the second axis 22. Thus, mount 38 can be attached to a first output 16 such as the hollow first spindle to drive a machine tool about the first axis 18 of rotation. This first spindle can therefore provide the rotation to the first or primary operation such as milling which occurs simultaneously with the secondary operation such as grinding. One skilled in the art will realize that various pulley and belt arrangements in accordance with the teaching of the present invention will provide a desired relative speed ration between the first output and second output.

Further, mount 38 is located along the first axis 18 and pulley 32 is located along the second axis 22. As mount 38 is rotated, the second axis 22 is orbited around the first axis 18. Further, as the second axis 22 is defined by the second output 20, the second output 20 can be an inner spindle orbiting within the hollow outer spindle which rotates about the first axis 18. Thus, input from the single motor 11 can provide a first 16 and second output 20 while orbiting the second output about the axis of rotation of the first output. With this embodiment an idler shaft 39 carries idler pulley 36.

Figure 7:
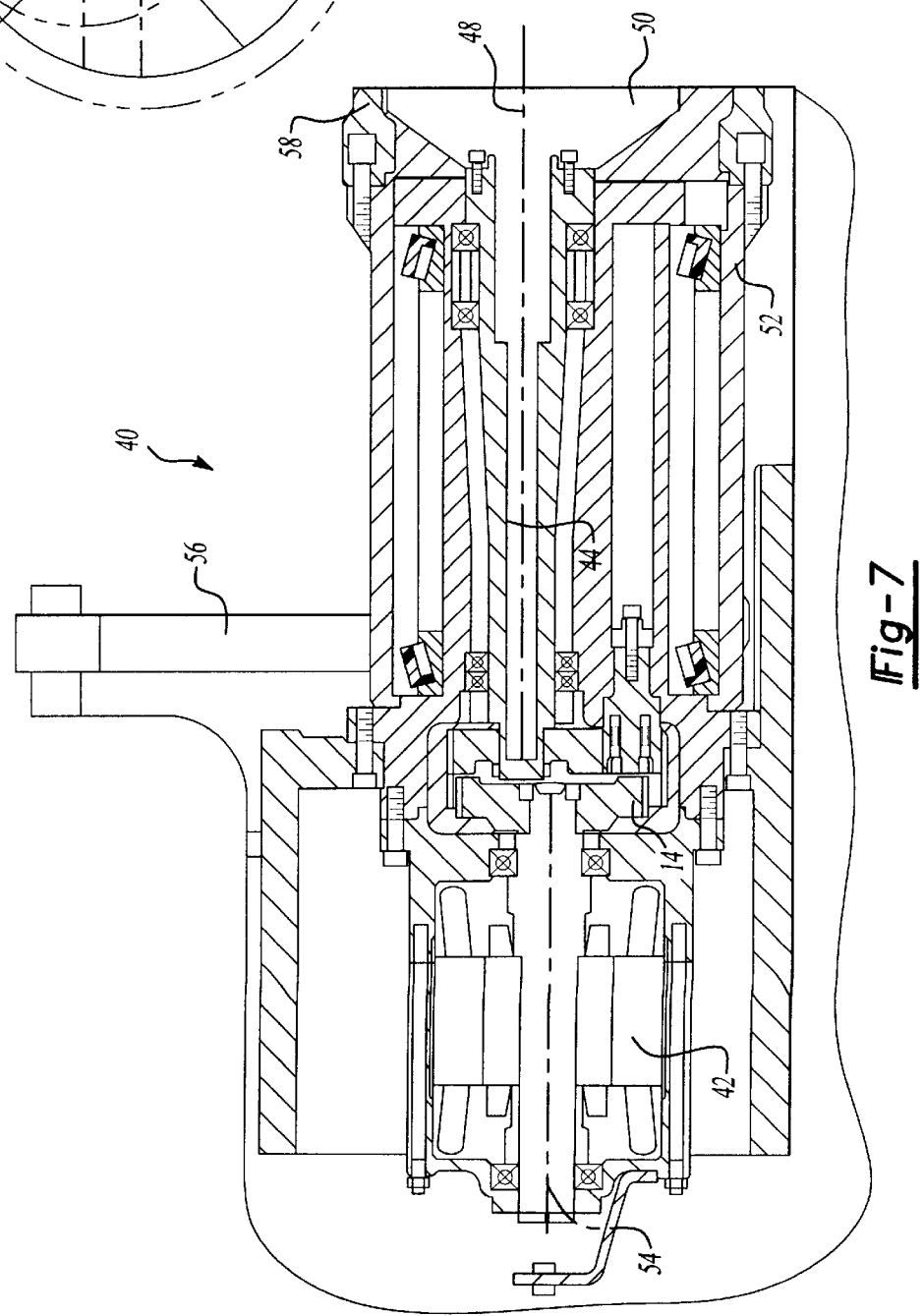
FIG. 7 is an alternate embodiment of a drive train assembly according to the present invention.

Referring to FIG. 7, an alternate embodiment of a drive train assembly according to the present invention is illustrated. The simultaneous operation drive machine 40 generally includes a motor assembly 42, and a drive train assembly 14. The drive train assembly 14 drives a first output 44 about a first axis 48 of rotation. The first output 44 is preferably attached to a grinding wheel 50 which rotates within a second output 52. The second output 52 is similarly rotatably drivable about a second axis 54 extending parallel to the first axis 48 and offset radially therefrom. In this embodiment the second output 52 is driven by a external drive (shown schematically at 56). The external drive 56 can be provided as a chain drive, belt drive, gear assembly, or the like such that the first 44 and second output 52 are drivable at relatively different speeds.

Figure 8:
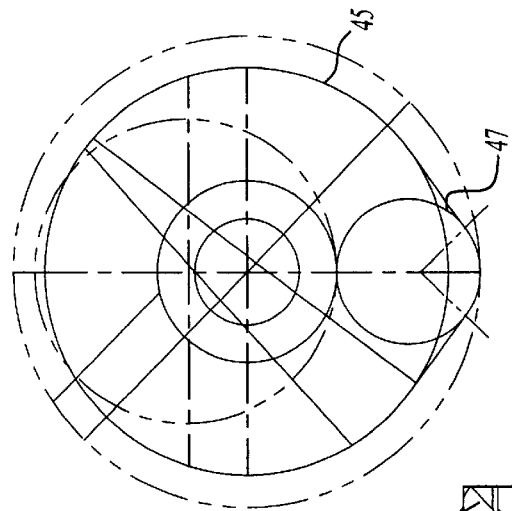
FIG. 8 is a schematic view of the pulley and belt interrelationship of FIG. 7 illustrating the rotatable motion of the first output.

As shown in FIG. 8, the grinding wheel 50 is therefore eccentrically mounted relative to the milling cutter, but its axis 48 does not rotate about axis 54. The first output 44 is attached to pulley 47, therefore, directly driven by a belt 45 which is attached to the drive train assembly 14.

The second output 52 is typically a hollow spindle to drive a milling head 58. The grinding wheel 50 is therefore eccentrically mounted relative to the milling cutter, but does not orbit as described above. Although a primary operation such as milling and a secondary operation such as grinding is illustrated, one skilled in the art will understand that the drive train assembly is equally applicable to other machine operations.

Referring to FIG. 9, an alternate embodiment of a drive train assembly according to the present invention is illustrated. The drive train assembly can similarly provide a quad output such as a multiple drill head to perform multiple simultaneous drill operations. The simultaneous operation drive machine 60 generally includes a motor assembly 62, and a drive train assembly 64. The drive train assembly 64 drives an output 66 about a first axis 68 of rotation. The first output 66 is preferably attached to a drilling tool 70. Although a single output is illustrated, one skilled in the art will realize that a plurality of outputs can be similarly provided such as the quad output shown. In this embodiment each output is drivably attached to an output pulley 72. The pulley 72 is driven by a double wide belt 73 which also engages pulley 74 attached to the motor assembly 62 through shaft 76.

The drive train assembly 64 is schematically shown in FIG. 10. Each of the individual output pulleys 72 are driven by the double wide belt 73 attached to a drive pulley 74. By providing various sized output pulleys 72, each output 66 can be at a different relative speed. Therefore, the single motor assembly 62 drives multiple outputs 66 at different relative speeds.

The foregoing description is to be exemplary rather than defined by any limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive apparatus, comprising:
   a single motor;
   a drive train assembly including a plurality of interrelated belts and pulleys drivable by said single motor, said drive train assembly including a first pulley having a first diameter and a first center of rotation and a second pulley having a second diameter and a second center of rotation, said second pulley center of rotation located within an area defined between said first center of rotation and said first diameter of said first pulley, and said second pulley axially offset from said first pulley;
   a belt driven by said second pulley to drive said first pulley;
   a first output drivable by said drive train assembly about a first axis of rotation; and
   a second output rotatably drivable by said drive train assembly about a second axis extending parallel to said first axis and offset therefrom simultaneously with said first output, said first and second output drivable by said drive train assembly at relatively different speeds.

2. The drive apparatus according to claim 1, wherein said second axis of said second output is drivable by said drive train assembly in an orbit about said first axis.

3. The drive apparatus according to claim 1, wherein said first output is disposed within said second output.

4. The drive apparatus according to claim 3, wherein said first output drives a milling tool and said second output drives a grinding tool.

5. The drive apparatus according to claim 1, wherein said first output and said second output are machine spindles.

6. A drive apparatus for a simultaneous operation machine, comprising:

a single motor;

a drive train assembly including a plurality of interrelated belts and pulleys drivable by said single motor, said drive train assembly including a first pulley having a first diameter and a first center of rotation and a second pulley having a second diameter and a second center of rotation, said second pulley center of rotation located within an area defined between said first center of rotation and said first diameter of said first pulley, and said second pulley axially offset from said first pulley;

a belt driven by said second pulley to drive said first pulley;

an outer spindle rotatably drivable by said drive train assembly about a first axis of rotation to perform a first operation; and an inner spindle disposed within said outer spindle rotatably drivable by said drive train assembly about a second axis extending parallel to said first axis and offset radially therefrom to perform a second operation simultaneously with said first operation.

7. The drive apparatus according to claim 6, wherein said second axis of said inner spindle is drivable by said drive train assembly in an orbit about said first axis.

8. The drive apparatus according to claim 6, wherein said outer and inner spindles are drivable by said drive train assembly at relatively different speeds.

9. A drive apparatus for a simultaneous operation machine, comprising:

a motor;

a drive train assembly including a plurality of interrelated belts and pulleys drivable by said single motor, said drive train assembly including a first pulley having a first diameter and a first center of rotation and a second pulley having a second diameter and a second center of rotation, said second pulley center of rotation located within an area defined between said first center of rotation and said first diameter of said first pulley, and said second pulley axially offset from said first pulley:

a belt driven by said second pulley to drive said first pulley;

a first output drivable by said drive train assembly about a first axis of rotation; and a second output rotatably drivable by said drive train assembly, and within said first output, about a fixed second axis extending parallel to, but offset from, said first axis.

* * * * *